(12) United States Patent
Beiswinger

(10) Patent No.: US 10,788,352 B1
(45) Date of Patent: Sep. 29, 2020

(54) WI/FI TANK MONITOR

(71) Applicant: BearClaw Technologies, LLC, Westbury, NY (US)

(72) Inventor: John Beiswinger, Westbury, NY (US)

(73) Assignee: BearClaw Technologies, LLC, Westbury, NY (US)

( * ) Notice: Subject to any disclaimer, the term of this patent is extended or adjusted under 35 U.S.C. 154(b) by 247 days.

(21) Appl. No.: 15/966,832

(22) Filed: Apr. 30, 2018

(51) Int. Cl.
G01F 23/296 (2006.01)
G01S 15/10 (2006.01)
F16B 1/00 (2006.01)
H04W 84/12 (2009.01)
H04B 11/00 (2006.01)
G01F 23/00 (2006.01)

(52) U.S. Cl.
CPC ............ G01F 23/2962 (2013.01); F16B 1/00 (2013.01); G01S 15/10 (2013.01); F16B 2001/0035 (2013.01); G01F 23/0069 (2013.01); H04B 11/00 (2013.01); H04W 84/12 (2013.01)

(58) Field of Classification Search
CPC .... G01N 29/28; G10K 11/02; G01F 23/2962; G01F 23/0069; F16B 1/00; F16B 2001/0035; G01S 15/10; H04W 84/12; H04B 11/00
USPC .................................................. 73/290 V, 644
See application file for complete search history.

(56) References Cited

U.S. PATENT DOCUMENTS

| | | |
|---|---|---|
| 3,484,630 A | 12/1969 | Schwartz |
| 3,553,636 A | 1/1971 | Baird |
| 4,229,798 A | 10/1980 | Rosie et al. |
| 4,280,126 A | 7/1981 | White |
| 4,616,152 A * | 10/1986 | Saito ...................... G10K 11/02 310/327 |
| 4,715,226 A | 12/1987 | Dorr |
| 4,805,453 A | 2/1989 | Haynes |
| 5,226,320 A | 7/1993 | Dages et al. |
| 5,319,972 A | 6/1994 | Oblak et al. |
| 5,586,085 A | 12/1996 | Lichte |
| 5,671,190 A | 9/1997 | Kroemer et al. |
| 5,755,136 A | 5/1998 | Getman et al. |
| 5,760,309 A | 6/1998 | Maltby et al. |
| 5,793,705 A | 8/1998 | Gazis et al. |

(Continued)

FOREIGN PATENT DOCUMENTS

| | | |
|---|---|---|
| DE | 102007059584 A1 | 6/2009 |
| EP | 0429687 A1 | 6/1991 |

(Continued)

OTHER PUBLICATIONS

OleumTech, H-Series Liquid Level Sensor Datasheet—HW5000-LS1 (Modbus) HW5000-LS2 (LevelMaster ASCII), 3 pages.

(Continued)

*Primary Examiner* — Suman K Nath
(74) *Attorney, Agent, or Firm* — Allen R. Morganstern; Alfred M. Walker

(57) ABSTRACT

A Wi-Fi tank monitor ultrasonically monitors liquid fuel oil in fuel oil tanks, as well as other liquids in respective liquid tanks. A transducer is magnetically attached to the bottom of a steel oil tank which will transmit ultrasonic pulses through the bottom of the tank and into the oil or other liquid. This wave is reflected by the top of the oil in the tank and be detected by the transducer on the bottom of the tank yielding the height of the oil or other liquid.

12 Claims, 6 Drawing Sheets

(56) References Cited

U.S. PATENT DOCUMENTS

| | | | |
|---|---|---|---|
| 5,836,192 A | 11/1998 | Getman et al. | |
| 6,142,015 A | 11/2000 | Getman et al. | |
| 6,892,572 B2 | 5/2005 | Breed et al. | |
| 6,895,814 B2 | 5/2005 | Benz | |
| 6,993,967 B2 | 2/2006 | Forgue | |
| 7,004,016 B1 | 2/2006 | Puskas | |
| 7,240,556 B2 | 7/2007 | Georgeson et al. | |
| 7,602,671 B2 | 10/2009 | Dionysiou | |
| 7,905,143 B2 | 3/2011 | Lagergren | |
| 8,104,341 B2 | 1/2012 | Lagergren et al. | |
| 8,223,027 B2 | 7/2012 | Jenkins et al. | |
| 8,412,473 B2 | 4/2013 | Woltring et al. | |
| 8,661,904 B2 | 3/2014 | Schmitt et al. | |
| 8,994,546 B2 | 3/2015 | Breed et al. | |
| 9,222,825 B2 | 12/2015 | Lienenkamp | |
| 9,310,236 B2 | 4/2016 | Baumoel | |
| 2008/0258841 A1* | 10/2008 | Sherrit | H01L 41/107 333/187 |
| 2009/0016164 A1 | 1/2009 | Dionysiou | |
| 2010/0126267 A1* | 5/2010 | Agam | G01F 23/2961 73/290 V |
| 2010/0242593 A1* | 9/2010 | Lagergren | G01D 5/48 73/290 V |
| 2014/0360264 A1* | 12/2014 | Vogel | G01F 23/2962 73/290 V |

FOREIGN PATENT DOCUMENTS

| | | |
|---|---|---|
| EP | 2677339 A1 | 12/2013 |
| WO | 8802124 A1 | 3/1988 |
| WO | 9202789 A1 | 2/1992 |
| WO | 9717591 A2 | 5/1997 |
| WO | 9828598 A1 | 7/1998 |
| WO | 2009026672 A1 | 3/2009 |

OTHER PUBLICATIONS

Tanklink Wireless Telemetry Systems for Tank Monitoring; http://www.tankling.com/Products/Chemicals/CeramicSensor; May 24, 2014, 888-826-5546, 2 pages.

Peng, Li; Yulei Cai; Xialong Shen; Sharon Nabuzaale; Jie Yin; and Jiaqiang Li; An Accurate Detection for Dynamic Liquid Level Based on MIMO Ultrasonic Transducer Array; IEE Transactions on Instrumentation and Measurement; vol. 64, No. 3, Mar. 2015; 14 pages.

ENAiKOON ultrasonic fuel-level sensor; ENAiKOON GmbH, Helmholtzstr, 2-9, 10587 Berlin, Germany; Tel +49 30 397475-30; FAX !30 397475-40; info@enaikoon.com; www.enaikoon.com; 4 pages.

* cited by examiner

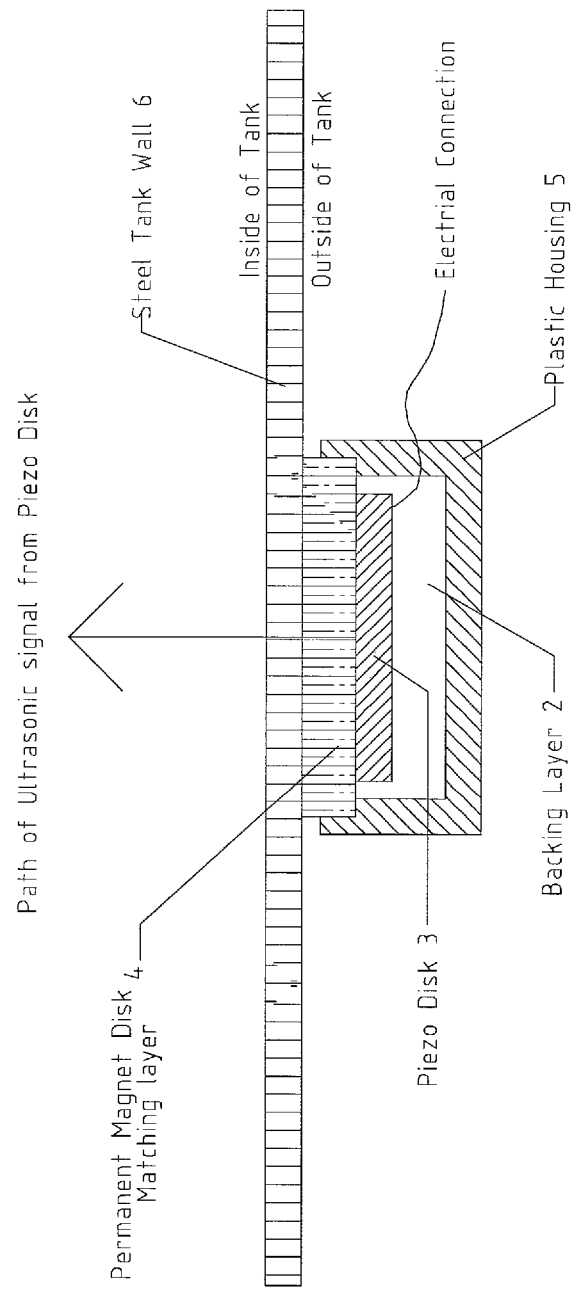

WI/FI TANK MONITOR

FIELD OF THE INVENTION

This document documents the design and architecture of a Wi-Fi tank monitor for ultrasonically monitoring liquid hydrocarbon fuel oil in fuel oil tanks, as well as other liquids in respective liquid tanks.

BACKGROUND OF THE INVENTION

It is well known in the industry that the typical construction of piezoelectric contact transducer consists of three distinct layers: the Backing Layer; the Active Element (the piezo element); and the Matching Layer, which is used to keep reflected waves in phase with the exiting waves.

Typical "top of the tank" transducers are inaccurate, because the transducer pulses would go through air in the empty, used space in the tank first and then into the fuel oil fluid remaining below. The travel of pulses though air has a typical "ring down" problem. Pulses traveling less through air are more accurate, because higher frequencies of pulses in general are more accurate.

Among prior art patents include the enclosed U.S. Pat. No. 4,229,798 of Rosie, which describes an ultrasonic transducer 12 located at the bottom of the oil tank. Rosie '798 notes "Time-of-Flight" (T.O.F.) by itself just gives the depth of the liquid in the tank. Rosie '798 calculates gallons remaining by taking into account the rounded bottom of a tank.

U.S. Pat. No. 7,602,671 of Dionysious describes an ultrasonic transducer monitor for measuring oil tank levels of fuel oil. But in Dionysious, there is a top mounted transducer.

U.S. Pat. No. 8,994,546 of Breed also describes a top mounted transducer, but which is coordinated with sensors located at the bottom of an oil tank.

OBJECTS OF THE INVENTION

It is therefore an object of the present invention to provide a fuel tank monitor where a magnet both attaches the transducer to a tank, but also where the magnet acts as the matching layer for the transducer.

It is therefore an object of the present invention to develop and deliver a consumer electronic device for accurately measuring home heating oil levels remotely and to view calculated results from a smart phone, tablet or computer.

It is also an object to be able to install a fuel tank oil monitor device without tools and which does not require breaking any seals on a fuel tank.

Other objects which will become apparent from the following descriptions of the present invention.

SUMMARY OF THE INVENTION

In keeping with these objects and others which may become apparent, the present invention is a magnetically mountable fuel tank monitor device which utilizes ultrasonic Time of Flight (TOF) to measure the tank oil level. A transducer is magnetically attached to the bottom of a steel oil tank which transmits ultrasonic pulses through the bottom of the tank and into the oil. This wave is reflected by the top of the oil in the tank and is detected by the transducer on the bottom of the tank yielding the height of the oil. This self mounting transducer does not need a separate magnet for mounting, and the ultrasonic signals travel through the magnet as a matching layer. The magnet is part of the transducer, not just an attachment magnet.

The magnet is all or part of the matching layer, or couples ultrasonic waves to the material for the tank, and is part of the ultrasonic transducer. All of the layers of materials between the piezo electric crystal and the material (such as fuel oil), are coupled to the ultrasonic signal and affect the matching layer.

While preferably the magnet is a neodymium magnet, it can be other magnets, such as, for example, a cobalt magnet or other magnet. However, neodymium has the properties of being both thin and strong, which makes it an ideal magnet and matching layer for the transducer of the present invention. The magnet can also be a combination of materials, such as neodymium and copper, for example. The magnet can also have one or more layers. When multiple layers are used for matching layers, the transducer achieves impedances that one cannot necessarily obtain with a single layer material.

While the transducer is configured for measuring liquid fossil fuels in a heating fuel tank, it can also work to determine levels of other hydrocarbons in tanks, as well as propane in a propane tank.

In one embodiment, by using the phase difference between drift of one signal to the other, with determination of the first detected pulse of one cycle of measurement as compared to that of the first detected pulse of the second cycle of measurement, one can thereby calculate the desired offset to correct the position of the first reflected cycle as if it had been detected. By applying this correction a more accurate TOF will be achieved.

The following assumptions, constraints and standards are applicable to the fuel tank monitor of the present invention:

a) the device is installable without tools and will not require breaking of any seals on tank.

b) the device is being equipped with a Wi-Fi radio that will connect to a local wireless network.

c) the device configuration defaults to the standard 275 gallon vertical tank but is configurable to other sizes and shapes of tanks to report actual volume or % full.

d) The device is capable of sending out emails and text messages on tank events, such as tank level falling below a specific level, the tank being filled, low battery and periodic messages of tank level.

e) The device operates in one of two modes:

1) in a "Cloud Mode" where the device wakes up from a deep sleep periodically, posts the information to a cloud server and then resumes sleep again; and 2) in an "Always Accessible Mode" where the device continuously listens for requests and responds to queries.

A webpage provides accessible configuration data, as well as current oil and battery level. It provides setup information, such as signal strength, and whether the sensor is properly placed. This only operates in the Always Accessible Mode.

The device utilizes ultrasonic Time of Flight (TOF) to measure the tank oil level. A transducer is magnetically attached to the bottom of a steel oil tank, or other magnetically attractant material, which transmits ultrasonic pulses through the bottom of the tank and into the oil. This wave of pulses is reflected by the top of the oil in the tank and is detected by the transducer on the bottom of the tank yielding the height of the oil.

In summary, the level monitoring system for monitoring liquid within an enclosed tank, includes an ultrasonic transducer mounted on an outside surface of a bottom wall of the tank. The transducer has a first signal generating means to send through the bottom wall upwardly directed ultrasonic pulses into the liquid within said tank, wherein the pulses are reflected downwardly by a top of the liquid within the tank.

The transducer has a second means to detect the reflected pulses and which utilizes ultrasonic Time of Flight, or uses measuring the phase between the upwardly directed pulses and the reflected pulses to measure height of the liquid within the tank.

A radio is preferably provided within the transducer transmitting height measurements taken by the transducer; and a mobile device receives and displays the calculated height measurements.

The fuel tank monitor of the present invention is removably attached, without use of tools, to the outside surface of said bottom wall of the tank and measures liquid levels, such as, for example, where the liquid is a fossil fuel.

The tank is made of material incorporating a ferrous metal, and the transducer incorporates a magnet for attaching the transducer to the bottom fuel tank wall. The transducer is self-mounting with the incorporated magnet, so no bracket or adhesive is needed.

The aforementioned radio is preferably Wi-Fi connected to a local wireless network. The transducer incorporates software to direct the radio to send out emails and text messages on liquid levels within the tank. The transducer also incorporates software to allow the system to operate in multiple modes, including in a "Cloud Mode", whereby the transducer wakes up from a deep sleep periodically to post level information, and in an "Always Accessible Mode", whereby the transducer is continuously listening for requests and responds to queries. The website is updated by the transducer and liquid levels in the tank are then displayed.

In one embodiment, the present invention is also a method of monitoring liquid levels within an enclosed tank, generally comprising the steps of:
  a) mounting an ultrasonic transducer on an outside surface of a bottom wall of the tank;
  b) the transducer sending (through the bottom wall of the tank) two or more upwardly directed ultrasonic pulses, into the liquid within the tank;
  c) the transducer detecting pulses reflected from a top of the liquid in the tank and utilizing ultrasonic Time of Flight (TOF), or uses measuring the phase between the upwardly directed pulses, and the reflected pulses, to measure height of the liquid within the tank;
  d) transmitting via a radio within the transducer determined height measurements taken by the transducer; and,
  e) using a mobile device for receiving and displaying these height measurements.

In the aforementioned method, the transducer is removably attached, without use of tools, to the outside surface of said bottom wall of the tank to measure liquid, such as, for example, in which liquid is a fossil fuel. The method also includes providing the tank being made of material incorporating a ferrous metal, and the transducer incorporates a magnet for attaching the transducer to the tank's bottom wall. The transducer is attached using an adhesive layer or is attached using a bracket.

The method also includes the step of providing the radio, wherein the radio is Wi-Fi connected to a local wireless network, and the transducer incorporates software to direct the radio to send out emails and text messages on determined liquid levels within the tank. The method also permits the transducer to incorporate software to allow the system to operate in multiple modes, including in a Cloud Mode whereby the transducer wakes up from a deep sleep periodically to post level information, and, alternatively, in an Always Accessible Mode, whereby the transducer is continuously listening for requests and responds to queries. The method also provides accumulation of data, which is maintained to provide accessible configuration data as well as current liquid and battery levels, and setup information, including signal strength and whether the transducer is properly placed against the lower wall of the tank.

BRIEF DESCRIPTION OF THE DRAWINGS

The present invention can best be understood in connection with the accompanying drawings. It is noted that the invention is not limited to the precise embodiments shown in drawings, in which:

FIG. 2A is a side view in cross section of the self-attaching ultrasonic transducer 1 of the present invention, showing the permanent magnet matching layer 4 attaching the ultrasonic transducer 1 to a steel tank wall.

DETAILED DESCRIPTION

The present invention has broad applications to many technical fields for measuring liquids in a variety of liquid filled tanks or receptacles. For illustrative purposes only, a preferred mode for carrying out the invention is described herein, wherein an ultrasonic transducer with a matching layer is magnetically, and therefore, non-destructively, attached to the bottom of a fuel oil tank, which utilizes the "Time of Flight" of the ultrasonic signals, to accurately measure the amount of oil or other fuel in the tank. The self-mounting ultrasonic transducer uses the magnetic layer in the matching layer of the transducer, where the ultrasonic signal travels through the magnetic layer.

Ultrasonic Transducer Configuration

Figure 1:
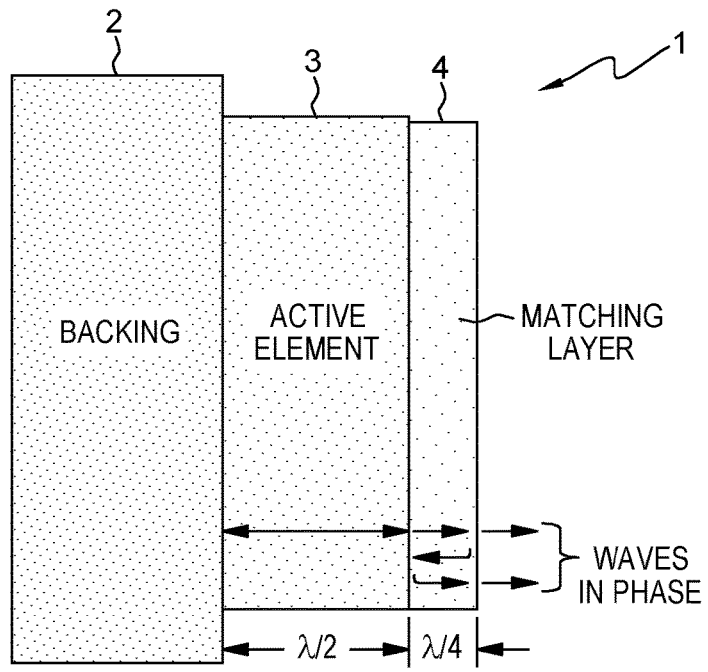
FIG. 1 is a prior art diagram of the attachment and backing layers of a typical prior art ultrasonic transducer of the present invention.

As shown in FIG. 1, it is well known in the industry that the typical construction of piezoelectric contact transducer 1 preferably includes three distinct layers: the Backing Layer 2; the Active Element 3 (the piezo element); and the Matching Layer 4, which is used to keep reflected waves in phase with the exiting waves.

The Backing Layer 2 acts as a dampening means, for absorbing sounds, such as those associated with a coefficient acoustical impedance. The backing layer can optionally be a Room Temperature Vulcanization (RTV) silicone, or a cotton cloth dampener.

The thickness of the active piezo element 3 is preferably about ½ the wavelength of the desired frequency with respect to the speed of sound of the active material.

The thickness of the matching layer 4 is preferably about ¼ the wavelength of the desired frequency, with respect to the speed of sound of the matching layer 4, such as being a magnetic disk.

Currently during installation, the components of the transducer 1 are generally glued or held in place by a mechanical bracket which can be held in place by magnetics.

To simplify installation on ferrous metal based tanks, this unique transducer 1 incorporates a magnet into the matching layer 4, either all or part.

Preferably, the magnet/matching layer 4 can be optionally made up of multiple layers of different materials, where the ultrasonic signal travels through the magnet of the magnet/matching layer 4. This eliminates any need for any glue or mechanical bracket simplifying the design configuration and installation of the device. Typically, a neodymium rare earth magnetic material is used, but the application is not limited to this type of magnet, in any typical implementation with a magnetic matching layer 4. Since neodymium has the properties of thinness and strength, it provides for an essential combination of an ideal magnet and matching layer for the transducer 1. The magnet/matching layer 4 can also be a combination of materials, such as neodymium and copper. The magnet/matching layer 4 can also have one or more layers. When multiple layers are used for matching layers, the transducer achieves impedances that one cannot necessarily obtain with a single layer material.

Figure 2:
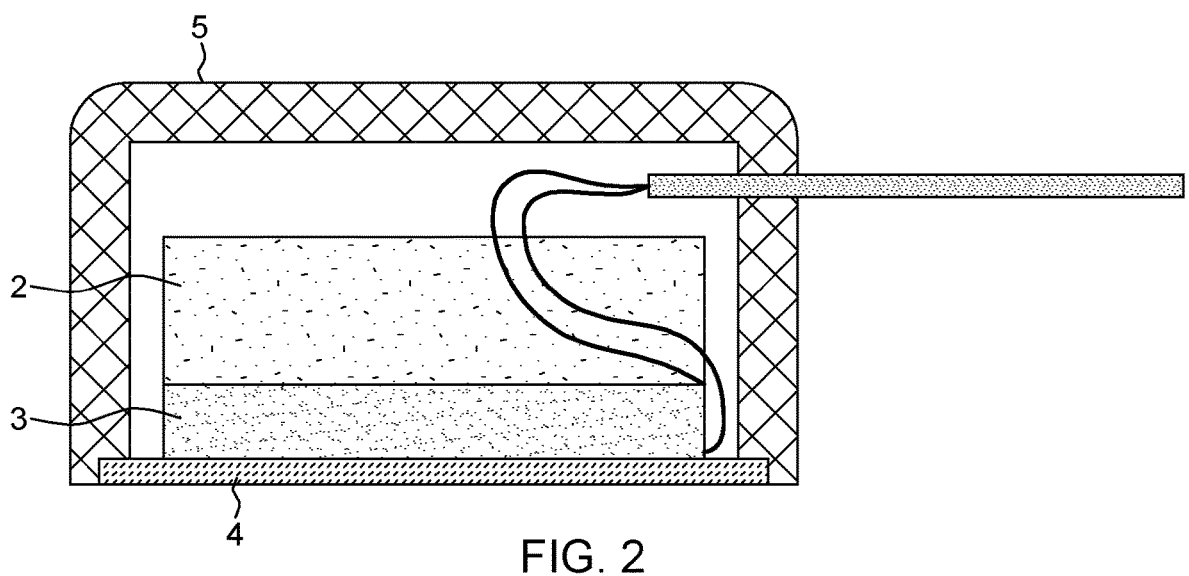
FIG. 2 is a side view in cross section of the ultrasonic transducer of the present invention, showing the unique magnetic matching layer.

As shown in FIG. 2 and FIG. 2A, the transducer 1, with backing layer 2, active piezo element 3 and matching magnetic layer 4, is housed in a housing, such as plastic housing 5. The magnet is all or part of the matching layer 4, or couples ultrasonic waves to the material for the tank, and is part of the self attaching ultrasonic transducer 1, which is attached by magnet matching layer 4 to the metal fuel tank 6.

Ultrasonic Time of Flight Measurement

In a typical ultrasonic Time of Flight (TOF) measurement system, an ultrasonic transducer is excited by a series of electric pulses. More than one pulse is typically required to get the transducer oscillating at sufficient amplitude to be able to detect the reflected signal with a sufficient signal to noise ratio.

Figure 3:
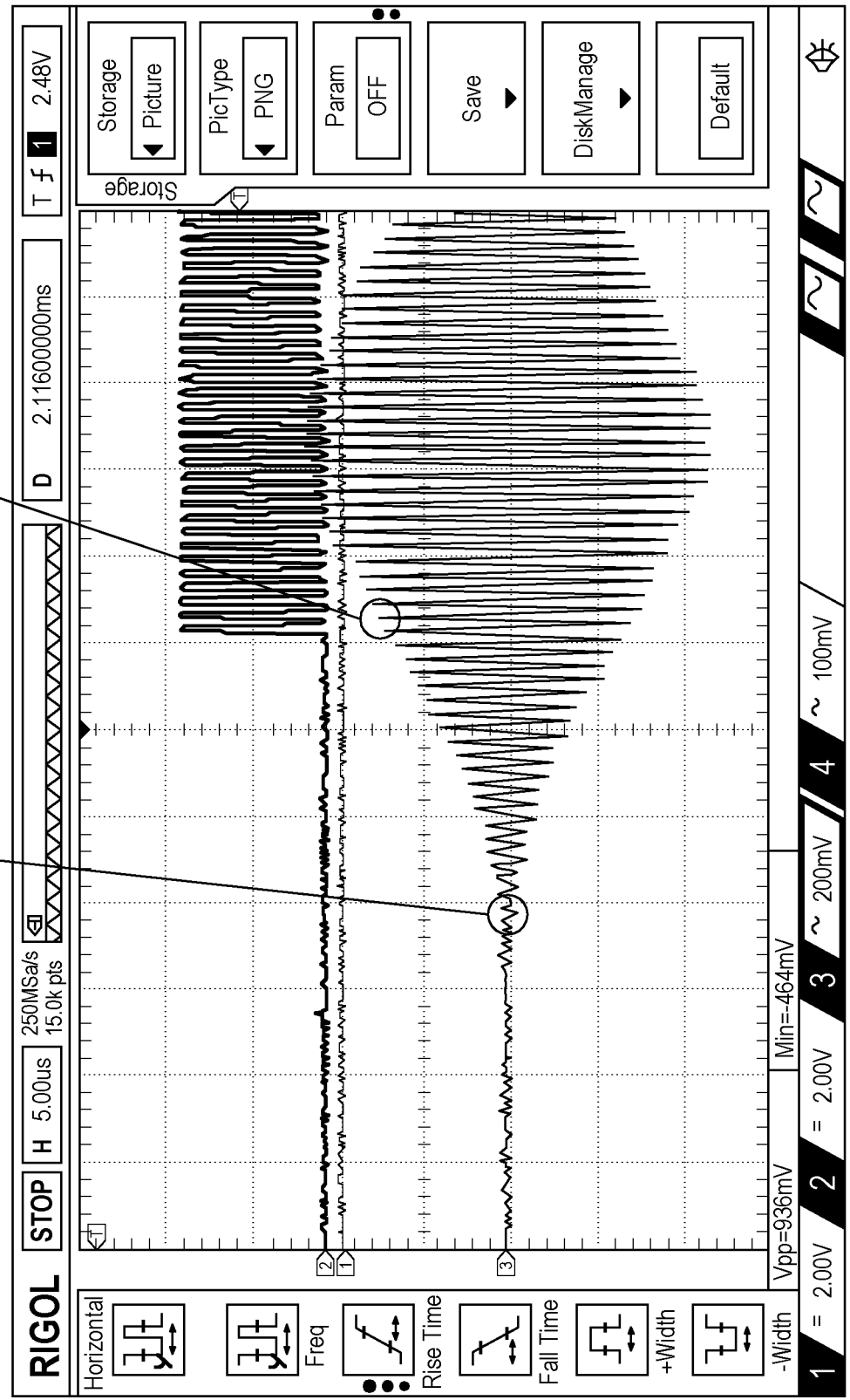
FIG. 3 is one example of a typical prior art oscilloscope trace of a reflected signal of 30 pulses (Trace #3) of the present invention, where the reflected signal builds up in amplitude, so that user needs a threshold in the trace, to avoid false trigger readings.

In FIG. 3 is shown one embodiment for measuring fuel levels, wherein there is shown an oscilloscope trance of a reflected signal of 30 pulses (Trace #3). As one can see from the trace, the first pulses are relatively weak compared to the ones that follow. The Trace #2 is where the reflection was of sufficient amplitude to be detected (pulses on right of screen).

Time of Flight (TOF) is typically measured from the beginning of the first transmitted pulse to the first reflected pulse that can be detected reliably. While this provides a good signal to noise ratio, it adds inaccuracy in the Time of Flight measurement. Since Time of Flight (TOF) is measured from the first transmitted pulse, one needs to measure to where the first transmitted pulse would be in the reflected signal if it were detectable.

Method to Improve Accuracy

To calculate where the first transmitted pulse would be in the reflected signal if it were detectable, one needs to know the position of the first detected pulse in the reflected signal with respect to the transmitted pulses (i.e.: is it the $1^{st}$, $2^{nd}$, $3^{rd}$, $4^{th}$, . . . n). Then, since the period of the pulses is known, one can subtract n−1 pulse periods from the measured Time of Flight to get the time for the first pulse.

In order to determine the position of the first detected pulse in the reflected signal with respect to the transmitted pulses, two cycles of Time of Flight measurement are used, each with a slightly different pulse period.

Figure 4:
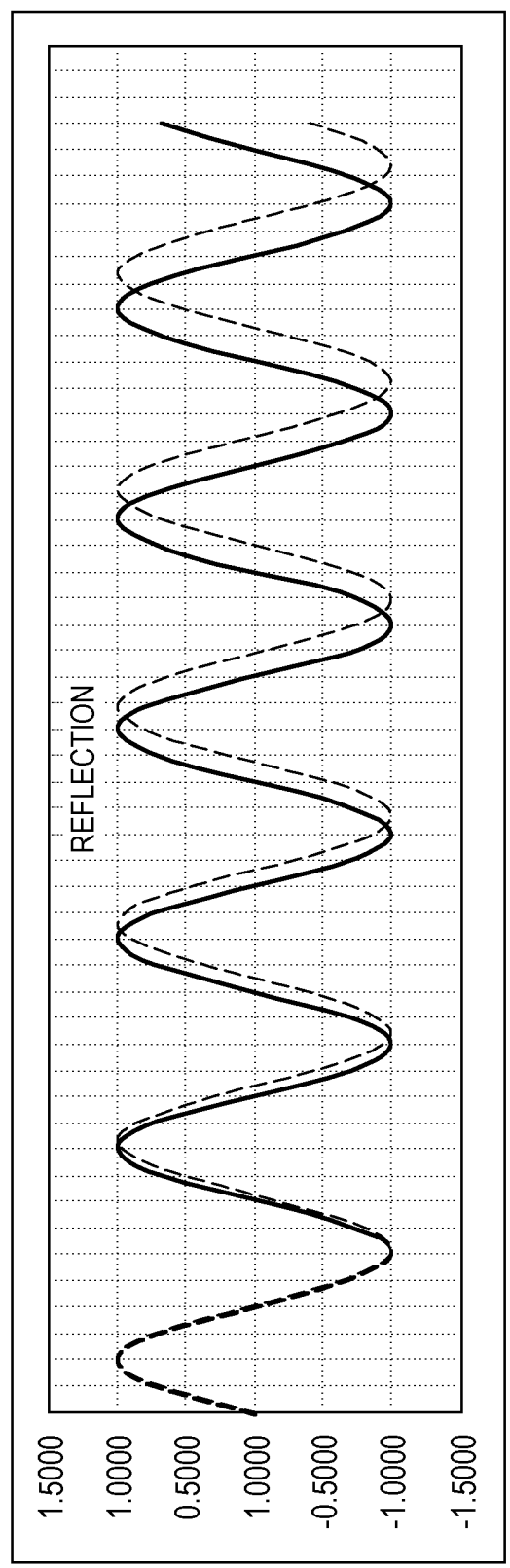
FIG. 4 is a simulation of an embodiment where the relationship of two respective Time of Flight measurements reflections are received with respect to the first transmitted pulse of the fuel tank monitor of the present invention, where, when looking at time and phase differences, the user can determine where the first pulse is located, in a hard to find peak of a sine wave.

In FIG. 4 there is shown a simulation of the relationship of the two Time of Flight (TOF) measurement reflections received with respect to the first transmitted pulse. This simulation in FIG. 4 shows each pulse of the reflected signals at the same amplitude for the sake of clarity. For example, the first TOF signal is shown in a solid line, and the other TOF signal is shown in a dashed line.

As one can see on the first pulse in FIG. 4, the phase relationship between the two signals is relatively in phase, but each subsequent pulse drifts out of phase by the difference between the two pulse intervals in an additive fashion. By comparing the phase difference between the detected pulses of both TOF measurements, one can calculate the position of the detected pulses with respect to the transmitted pulses, which allows the location of the first pulse to be calculated.

There are many ways to compare the phase difference between the two TOF measurements. The method used here can be one or more of the following, such as a) Positive going zero crossings; b) Negative going zero crossings; c) Positive peeks; and d) Negative peeks. The differences for each pulse can be calculated as follows. The calculations below assume the following:

1. TOFPulsePeriodA<TOFPulsePeriodB
2. The first Pulse is 1 the second is 2 . . . and represented by N.
3. The additive difference is less than TOFPulsePeriodA.

For Positive going zero crossings Delta=(TOFPulsePeriod B−TOFPulsePeriodA)×(N−1).

For Negative going zero crossings Delta=((TOFPulsePeriod B−TOFPulsePeriodA)×(N−1))+(TOFPulsePeriodB−TOFPulsePeriodA)/2.

For Positive peeks Delta=(TOFPulsePeriodB−TOFPulsePeriod A)×(N−1))+(TOFPulsePeriodB−TOFPulsePeriodA)/4.

For Negative peeks Delta= (TOFPulsePeriodB=TOFPulsePeriodA)×N)−(TOFPulsePeriodB−TOFPulsePeriodA)/4.

By using the phase difference between drift of one signal to the other, the first detected pulse of one cycle of measurement as compared to that of the first detected pulse of the second cycle of measurement, one can thereby calculate the desired offset to correct the position of the first reflected cycle as if it had been detected. By applying this correction, a more accurate TOF will be achieved, and a more accurate fuel level in the tank will be determined.

Device Design

Figure 5:
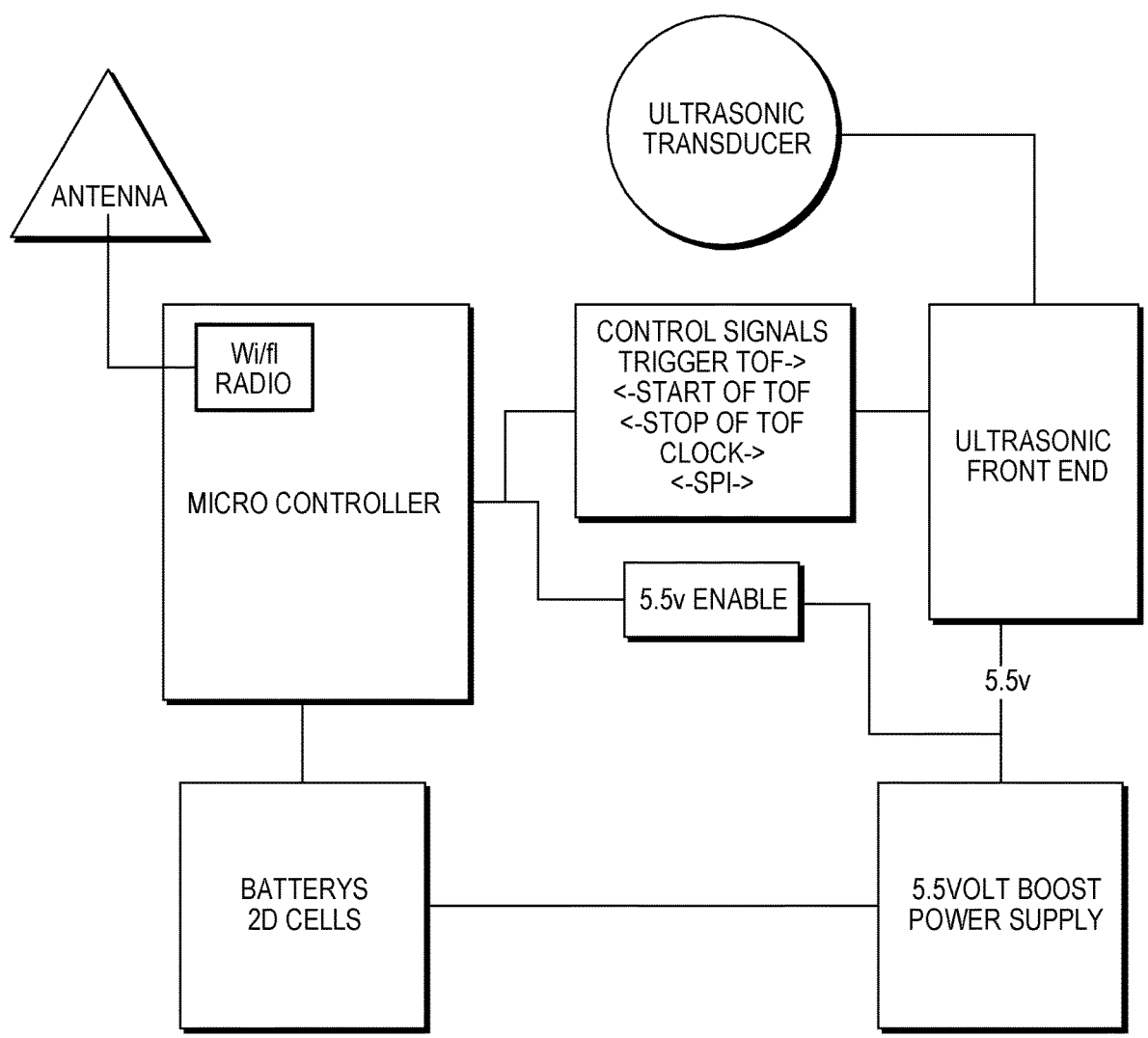
FIG. 5 is a basic block diagram of the fuel tank monitor of the present invention.

FIG. 5 is a basic Block diagram of the device. For example, the Ultrasonic Transducer houses the piezo element and a thermistor. Since the speed of sound is dependent on the temperature of the media, it is important to compensate for temperature changes to maintain accuracy.

The Ultrasonic Front End shown in the block diagram of FIG. 5 generates the transmit pulses to the transducer, reception of the reflected signal and has the following interface with the microcontroller.

Trigger TOF—This signal makes the Ultrasonic Front End to start a TOF Cycle.

Start TOF—This signal indicates the start of the first transmit pulse and is used as the starting point for the TOF time measurement.

Stop TOF—This signal is normally low and goes high at the Positive going zero crossing point of a reflected pulse with amplitude above the minimum detection level. It goes back low at the Negative going zero crossing point of the same pulse.

A clock is generated by Pulse Width Modulation (PWM) in the microcontroller and is the basis for the timing of the pulse period.

SPI—is a digital interface to configure the Ultrasonic Front End settings, such as number of transmit pulses and the reflected pulse minimum detection threshold.

Figure 6:
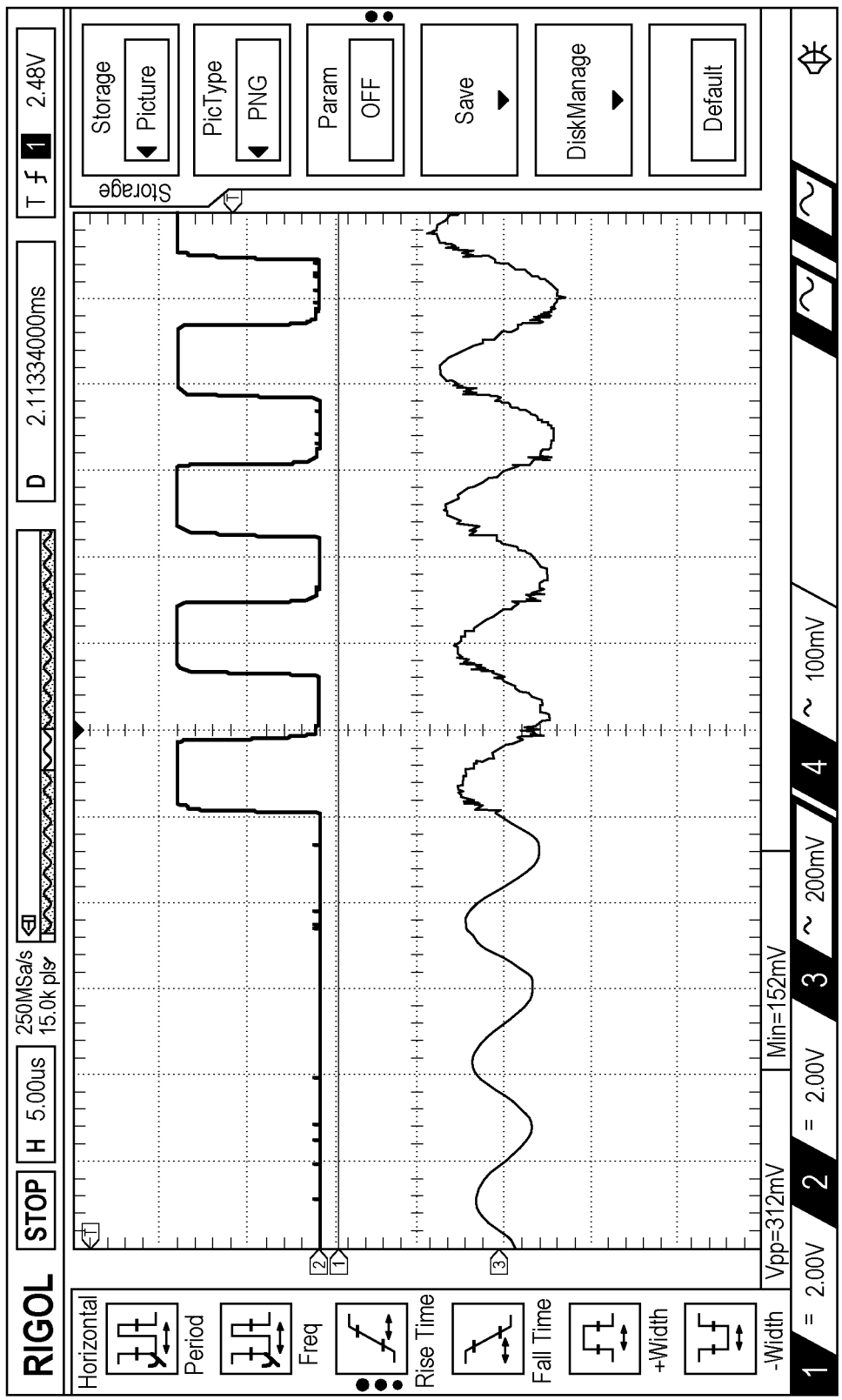
FIG. 6 is a is an example of the stop signals generated #2 with respect to the Reflected signal Trace #3.

FIG. 6 is an example of the stop signals generated #2 with respect to the reflected signal trace #3. Preferably, as shown in block diagram FIG. 5, a boost power supply is provided. The boost power supply is required to raise the voltage proved by the battery, as a higher voltage is required to drive the piezo transducer. The amount of voltage boost depends on the particular application.

This boost power supply boosts the output of the power supply, such as, for example, with 2 D or 2 AA batteries in series to 5.5 v, to provide sufficient drive to transducer 1. Alternatively, the unit device can be powered by a wall transformer.

The boost power supply can be enabled and disabled by the microcontroller shown in block diagram FIG. 5, to save battery when it is not needed.

The microcontroller shown in block diagram FIG. 5 handles all management of the device and is responsible for timing of the "Start Stop" signals from the "Ultrasonic Front End". It is controlled by periodic wake from sleep and execution of TOF measurements. It also controls reporting of measurements to email, text messages and the cloud servers. The microcontroller is equipped with Wi/Fi transceiver.

The Ultrasonic Front End handles generation of the transmit pulses to the transducer 1, Reception of the reflected signal and has the following interface with the microcontroller.

Example: TOF Measurements Cycle

1. The 5.5 volt supply is enabled.
2. The PWM is programmed to generate the required clock for the Pulse period for the first TOF cycle and enabled to the Ultrasonic Front End.
3. Two capture/compare timers in the microcontroller are configured to record the timing of the rising and falling edges of the Start TOF and Stop TOF's.
4. Trigger TOF signal is asserted to trigger a TOF cycle.
5. After TOF is complete, capture/compare timer's measurements are saved for analysis.
6. The PWM is reprogrammed to generate the required clock for the pulse period for the second TOF cycle.
7. Two capture/compare timers in the microcontroller are configured to record the timing of the rising and falling edges of the Start TOF and Stop TOF's.
8. Trigger TOF signal is asserted to trigger a TOF cycle for second time.
9. Data from both TOF cycles are analyzed.
10. The PWM for the clock is disabled.
11. The 5.5 volt supply is disabled.

Example: TOF Data Analyses

1. All TOF data is checked for consistency. The timing of all zero crossings, both Positive and Negative, are checked with their adjacent respective zero crossings (i.e. Positive or Negative) and any zero crossings not within 10% of the Pulse interval are disregarded.
2. The timings of the zero crossings of both TOF measurements are compared to determine their offset at each zero crossings. The offsets are compared to the calculated zero crossings for each pulse offset to determine the pulse offset to the first transmitted pulse.
3. N-1 pulse times are subtracted from the measured TOF to yield the true TOF.

In summary, a monitoring system for monitoring a level of a liquid present within an enclosed tank, comprises an ultrasonic transducer 1 with means for transmitting and receiving ultrasound signals, and means for processing the received ultrasound signals to generate a level signal indicative of the liquid level; and a means for non-destructively mounting the ultrasonic transducer 1 to an outer surface of a wall of the enclosed tank, wherein the means for non-destructively mounting the ultrasonic transducer 1 also acts as a magnet/matching layer 4 of the ultrasonic transducer 1.

The means for non-destructively mounting comprises a magnet, preferably a neodymium magnet. The ultrasonic transducer 1 is positioned against the outer surface of the wall of the enclosed tank and the means for non-destructively mounting (for example, the magnet/matching layer 4) is positioned against a surface of the ultrasonic transducer 1 opposing a surface in contact with the outer surface of the wall, such as the bottom wall of a tank containing a fossil fuel. To attract the magnet/matching layer 4, the tank is made of material incorporating a ferrous metal.

The ultrasonic transducer 1 includes a housing 5 and wherein the means for non-destructively mounting which acts as the magnet/matching layer 4 is positioned inside the transducer housing 5.

The ultrasonic transducer 1 utilizes ultrasonic Time of Flight (TOF) to measure the level of liquid within the enclosed tank. Optionally, the transducer 1 uses phase difference between drift of one signal to the other, and wherein, with determination of the first detected pulse of one cycle of measurement, as compared to that of the first detected pulse of the second cycle of measurement, one can thereby calculate the desired offset to correct the position of the first reflected cycle as if it had been detected, whereby further by applying this correction a more accurate TOF is achieved.

A means for processing includes a radio transmitter, which preferably includes a processor with a memory in which is stored computer-readable instructions that enable the monitoring system to operate multiple modes, including a cloud mode by which, according to a predetermined time interval, the transducer 1 wakes up from a deep sleep, to detect the liquid level, and communicates the level information, and including a constant monitoring mode by which transducer 1 detects and communicates the liquid level at a constant rate of time. In this transmission feature, the liquid level signal is communicated to a website whereat the liquid levels are displayed. The radio may be connected by WiFi, Bluetooth or cellular network to a local wireless network.

Optionally, the ultrasonic transducer housing 5 is also attached by adhesive or by a bracket, in addition to the magnet/matching layer 4.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A monitoring system for monitoring a level of a liquid present within an enclosed tank, comprising:
   a self-attaching ultrasonic transducer with a transceiver for transmitting and receiving ultrasound signals, and a processor for processing the received ultrasound signals to generate a level signal indicative of the liquid level; and
   a permanent magnet for non-destructively mounting the self-attaching ultrasonic transducer to an outer surface of a wall of the enclosed tank, wherein said permanent magnet for non-destructively mounting the ultrasonic transducer also acts as all or part of a matching layer of said ultrasonic transducer.

2. The mounting system according to claim 1, wherein said permanent magnet for non-destructively mounting the self-attaching ultrasonic transducer couples the ultrasonic signal of said self-attaching ultrasonic transducer.

3. The monitoring system according to claim 1, wherein said permanent magnet is neodymium.

4. The monitoring system according to claim 1, wherein the self-attaching ultrasonic transducer is positioned against the outer surface of the wall of the enclosed tank and said permanent magnet for non-destructively mounting is positioned against a surface of the self-attaching ultrasonic transducer opposing a surface in contact with the outer surface of the wall.

5. The monitoring system according to claim 1, wherein the wall is a bottom wall.

6. The monitoring system according to claim 1, wherein the liquid is a fossil fuel.

7. The monitoring system according to claim 1, in which said tank is made of material incorporating a ferrous metal.

8. The monitoring system according to claim 1, wherein the self-attaching ultrasonic transducer comprises a housing and wherein said permanent magnet for non-destructively mounting which acts as said matching layer is positioned inside the transducer housing.

9. The monitoring system according to claim 1, wherein the processor for processing includes a radio transmitter.

10. The monitoring system according to claim 9 in which said radio transmitter is connected by WiFi, Bluetooth® or cellular network to a local wireless network.

11. The monitoring system according to claim 1, wherein the processor for processing comprises a non-volatile memory in which is stored computer-readable instructions that enable the monitoring system to operate multiple modes, including a cloud mode by which, according to a predetermined time interval, the transducer wakes up from a deep sleep to detect the liquid level, and communicate the level information, and including a constant monitoring mode by which transducer detects and communicates the liquid level at a constant rate of time.

12. The monitoring system according to claim 11, wherein the liquid level signal is communicated to a website whereat the liquid levels are displayed.

* * * * *